(12) United States Patent
Jiao et al.

(10) Patent No.: US 9,214,007 B2
(45) Date of Patent: Dec. 15, 2015

(54) GRAPHICS PROCESSOR HAVING UNIFIED CACHE SYSTEM

(75) Inventors: Jeff Jiao, San Jose, CA (US); Timour Paltashev, Laveen, AZ (US)

(73) Assignee: VIA TECHNOLOGIES, INC., Taipei (TW)

( * ) Notice: Subject to any disclaimer, the term of this patent is extended or adjusted under 35 U.S.C. 154(b) by 2443 days.

(21) Appl. No.: 12/019,845

(22) Filed: Jan. 25, 2008

(65) Prior Publication Data
US 2009/0189909 A1 Jul. 30, 2009

(51) Int. Cl.
*G06T 1/60* (2006.01)

(52) U.S. Cl.
CPC .......................... *G06T 1/60* (2013.01)

(58) Field of Classification Search
USPC .......................... 345/557, 530, 531
See application file for complete search history.

(56) References Cited

U.S. PATENT DOCUMENTS

| | | | |
|---|---|---|---|
| 6,597,363 B1 * | 7/2003 | Duluk et al. | 345/506 |
| 6,665,767 B1 * | 12/2003 | Comisky et al. | 711/3 |
| 7,454,599 B2 | 11/2008 | Jiao et al. | |
| 7,468,726 B1 * | 12/2008 | Wloka et al. | 345/421 |
| 7,692,660 B2 | 4/2010 | Markovic et al. | |
| 2004/0196281 A1 | 10/2004 | Huang | |
| 2005/0091616 A1 | 4/2005 | Wang et al. | |
| 2007/0091088 A1 | 4/2007 | Jiao et al. | |

FOREIGN PATENT DOCUMENTS

| | | |
|---|---|---|
| CN | 1056968 A | 12/1991 |
| CN | 1928918 A | 3/2007 |

OTHER PUBLICATIONS

English translation of abstract of CN 1928918 A.
English translation of abstract of CN 1056968 A.

\* cited by examiner

*Primary Examiner* — Maurice L McDowell, Jr.
(74) *Attorney, Agent, or Firm* — McClure, Qualey & Rodack, LLP

(57) ABSTRACT

Graphics processing units (GPUs) are used, for example, to process data related to three-dimensional objects or scenes and to render the three-dimensional data onto a two-dimensional display screen. One embodiment, among others, of a unified cache system used in a GPU comprises a data storage device and a storage device controller. The data storage device is configured to store graphics data processed by or to be processed by one or more shader units. The storage device controller is placed in communication with the data storage device. The storage device controller is configured to dynamically control a storage allocation of the graphics data within the data storage device.

7 Claims, 7 Drawing Sheets

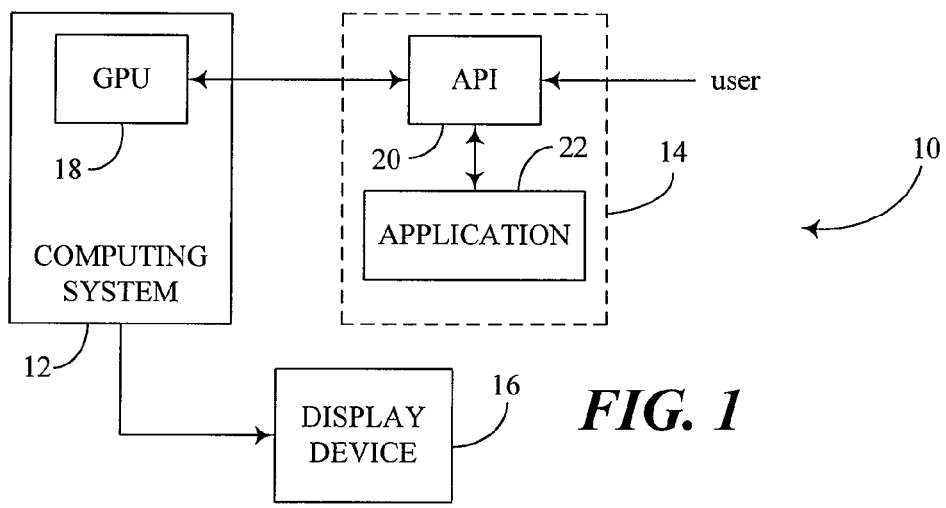
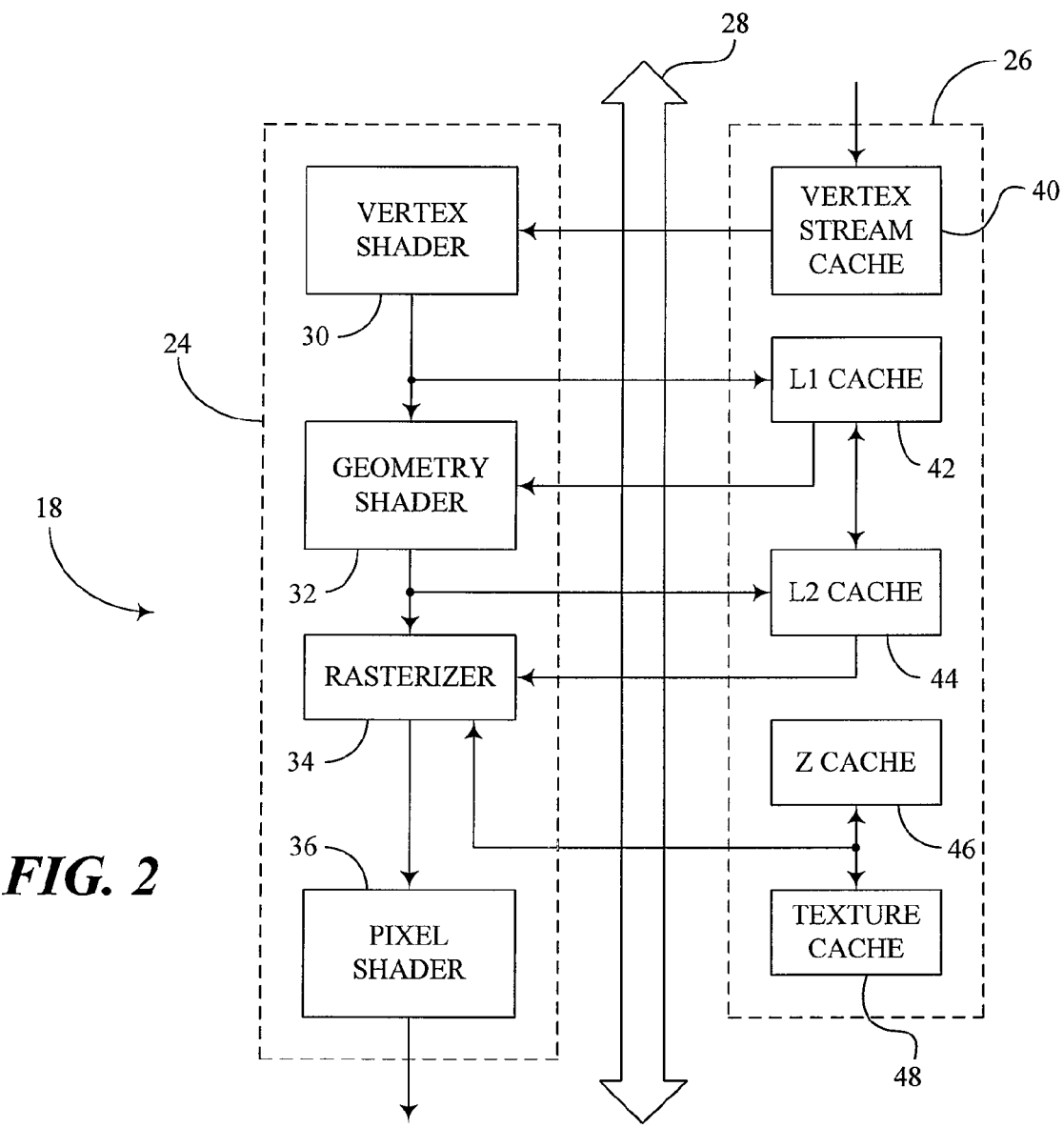
*FIG. 1*
*FIG. 2*

GRAPHICS PROCESSOR HAVING UNIFIED CACHE SYSTEM

CROSS-REFERENCE TO RELATED APPLICATIONS

This application is related to copending U.S. patent application Ser. No. 12/019,741, filed on the same day as the present application, and entitled "Graphics Processor Having Unified Shader Unit," which is incorporated by reference in its entirety into the present disclosure.

TECHNICAL FIELD

The present disclosure generally relates to three-dimensional computer graphics systems. More particularly, the disclosure relates to cache and control systems within a graphics processing core system.

BACKGROUND

Three-dimensional (3D) computer graphics systems, which can render objects from a 3D world (real or imaginary) onto a two-dimensional (2D) display screen, are currently used in a wide variety of applications. For example, 3D computer graphics can be used for real-time interactive applications, such as computer games, virtual reality, scientific research, etc., as well as off-line applications, such as the creation of high resolution movies, graphic art, etc. Because of a growing interest in 3D computer graphics, this field of technology has been developed and improved significantly over the past several years.

In order to render 3D objects onto a 2D display, objects to be displayed are defined in a 3D "world space" using space coordinates and color characteristics. The coordinates of points on the surface of an object are determined and the points, or vertices, are used to create a wireframe connecting the points to define the general shape of the object. In some cases, these objects may have "bones" and "joints" that can pivot, rotate, etc., or may have characteristics allowing the objects to bend, compress, deform, etc. A graphics processing system can gather the vertices of the wireframe of the object to create triangles or polygons. For instance, an object having a simple structure, such as a wall or a side of a building, may simply be defined by four planar vertices forming a rectangular polygon or two triangles. A more complex object, such as a tree or sphere, may require hundreds of vertices, forming hundreds of triangles, to define the object.

In addition to defining vertices of an object, the graphics processor may also perform other tasks such as determining how the 3D objects will appear on a 2D screen. This process includes determining, from a single "camera view" pointed in a particular direction, a window frame view of this 3D world. From this view, the graphics processor can clip portions of an object that may be outside the frame, hidden by other objects, or facing away from the "camera" and hidden by other portions of the object. Also, the graphics processor can determine the color of the vertices of the triangles or polygons and make certain adjustments based on lighting effects, reflectivity characteristics, transparency characteristics, etc. Using texture mapping, textures or colors of a flat picture can be applied onto the surface of the 3D objects as if putting skin on the object. In some cases, the color values of the pixels located between two vertices, or on the face of a polygon formed by three or more vertices, can be interpolated if the color values of the vertices are known. Other graphics processing techniques can be used to render these objects onto a flat screen.

As is known, the graphics processors include core data processing components referred to as "shaders". Software developers or artists can utilize these shaders to create images and control frame-by-frame video as desired. For example, vertex shaders, geometry shaders, and pixel shaders are commonly included in graphics processors to perform many of the tasks mentioned above. Also, some tasks are performed by fixed function units, such as rasterizers, pixel interpolators, triangle setup units, etc. By creating a graphics processor having these individual components, a manufacturer can provide a basic tool for creating realistic 3D images or video.

Graphics processors utilize cache in many of the stages of processing. The output of one shader device is typically transmitted to one cache device, which then feeds the data values to the next shader device. The next shader device outputs its results to another cache device, and so on. When a particular scene or object requires a greater use of one certain shader device over another, the associated cache of the shader device is likewise utilized to a greater extent. Since different software developers or artists may have different needs, depending on their particular application, it can be difficult to determine up front how much of each type of cache memory may be needed to store data processed by the shaders of the processing core. Thus, a need exists in the art of graphics processors to address the issue regarding the proportion of different types and sizes of cache devices. It would therefore be desirable to provide a graphics processing system capable of overcoming these and other inadequacies and deficiencies in the 3D graphics technology.

SUMMARY

Systems and methods are described in the present disclosure for processing graphics data and storing graphics data in a cache system. One embodiment, among others, of a graphics processing system comprises a processing pipeline and a cache system in communication with each other. The processing pipeline includes a plurality of graphics shader stages, each graphics shader stage of the processing pipeline configured to perform one or more shading operations. The cache system comprises a plurality of storage units, where each storage unit is configured to store data associated with the graphics shader stages of the processing pipeline. The cache system comprises a control device that is configured to manage an allocation of said data with respect to the storage units of the cache system.

In another embodiment, a cache system of a graphics processing unit (GPU) is disclosed. The cache system of this embodiment comprises a data storage device and a storage device controller. The data storage device is configured to store graphics data processed by or to be processed by one or more shader units. The storage device controller, which is in communication with the data storage device, is configured to dynamically control a storage allocation of the graphics data within the data storage device.

Furthermore, one embodiment, among others, of a method for handling data in a graphics processing apparatus is described herein. The method comprises analyzing the activity level of a plurality of graphics processing shaders. The method also comprises determining the data storage needs of the plurality of graphics processing shaders based on the respective activity level of each graphics processing shader. Based on the data storage needs of each graphics processing shader, the method further allocates portions of a memory device.

Other systems, methods, features, and advantages of the present disclosure will be apparent to one having skill in the art upon examination of the following drawings and detailed description. It is intended that all such additional systems, methods, features, and advantages be included within this description and protected by the accompanying claims.

BRIEF DESCRIPTION OF THE DRAWINGS

Many aspects of the embodiments disclosed herein can be better understood with reference to the following drawings. Like reference numerals designate corresponding parts throughout the several views.

FIG. 1 is a block diagram of a graphics processing system according to one embodiment of the present disclosure.

FIG. 2 is a block diagram of an embodiment of the graphics processing unit shown in FIG. 1.

DETAILED DESCRIPTION

Figure 3A:
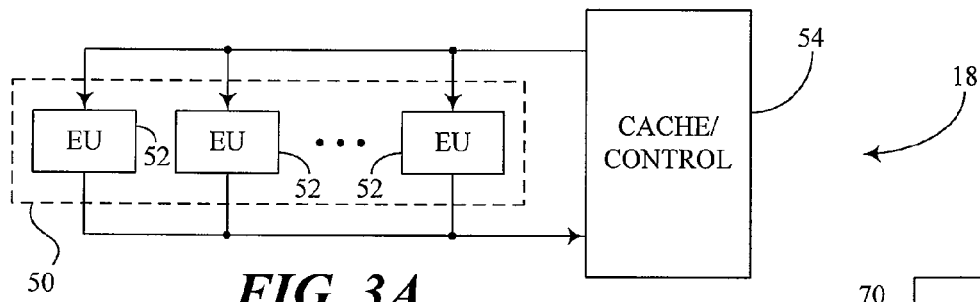
FIG. 3A is a block diagram of another embodiment of the graphics processing unit shown in FIG. 1.

Conventionally, graphics processors or graphics processing units (GPUs) are incorporated into a computer system for specifically performing computer graphics. With the greater use of three-dimensional (3D) computer graphics, GPUs have become more advanced and more powerful. Some tasks normally handled by a central processing unit (CPU) are now handled by GPUs to accomplish graphics processing having great complexity. Typically, GPUs may be embodied on a graphics card attached to or in communication with a motherboard of a computer processing system.

GPUs contain a number of separate units for performing different tasks to ultimately render a 3D scene onto a two-dimensional (2D) display screen, e.g. a television, computer monitor, video screen, or other suitable display device. These separate processing units are usually referred to as "shaders" and may include, for example, vertex shaders, geometry shaders, and pixel shaders. Also, other processing units, referred to as fixed function units, such as pixel interpolators and rasterizers, are also included in the GPUs. When designing a GPU, the combination of each of these components is taken into consideration to allow various tasks to be performed. Based on the combination, the GPU may have a greater ability to perform one task while lacking full ability for another task. Because of this, hardware developers have attempted to place some shader units together into one component. However, the extent to which separate units have been combined has been limited.

In addition, the inputs and outputs of each shader unit are stored in different cache devices. Each cache device is designated for handling data for a particular shader unit. Because of this, each cache device is utilized in accordance with the usage of the corresponding shader unit.

The disclosure of related U.S. patent application Ser. No. 12/019,741 discusses the combining of the shader units and fixed function units into a single unit, referred to as a unified shader. The unified shader has the ability to perform the functions of vertex shading, geometry shading, and pixel shader, as well as perform the functions of rasterization, pixel interpolation, etc.

In the present disclosure, a cache system is disclosed for operating with this unified shader or with other arrangements of shader devices. The cache system can include an accumulation of the caches that in the prior art are kept separate. Instead of designing the graphics processor with separate cache devices spread across the processor (as is done in the prior art), the unified cache device in the present disclosure can be confined to a single location, thereby taking up less space on the silicon die or processor board.

Also, the present disclosure improves upon the prior art cache system by allowing the cache system to be allocated as needed. Thus, when one particular shader unit, and its corresponding cache, may be utilized to a greater extent, the available resources can be allocated to better suit the needs. Based on the particular need at the time, the allocation of the cache resources can be dynamically adjusted. In this way, the cache can be utilized more efficiently. The prior art processors are designed to have a maximum amount of storage for each cache device, but that amount cannot be changed. By adjusting the allocation of cache according to the teachings of the present disclosure, the need to have a maximum amount of cache for each cache device is no longer a consideration. Instead, a total amount of cache is designed with the GPU to be shared by the shader units. In this respect, the total storage capacity of the cache can remain the same, or can actually be reduced, with respect to the prior art processors. However, a greater amount can be allocated when the need arises, thereby providing greater flexibility for the software developer. Another advantage of the present teachings is that the reallocation schemes can reduce bottleneck situations that may occur in the processor pipeline.

FIG. 1 is a block diagram of an embodiment of a computer graphics system 10. The computer graphics system 10 includes a computing system 12, a graphics module 14, and a display device 16. The computing system 12 includes, among other things, a graphics processing unit (GPU) 18 for processing at least a portion of the graphical data handled by the computing system 12. In some embodiments, the GPU 18 may be configured on a graphics card within the computing system 12. The GPU 18 processes the graphics data to generate color values and luminance values for each pixel of a frame for display on the display device 16, normally at a rate of 30 frames per second. The graphics software module 14 includes an application programming interface (API) 20 and a software program application 22. The API 20, in this embodiment, adheres to the latest OpenGL and/or DirectX specifications.

In recent years, a need has arisen to utilize a GPU having more programmable logic. In this embodiment, the GPU 18 is configured with greater programmability. A user can control a number of input/output devices to interactively enter data and/or commands via the graphics module 14. The API 20, based on logic in the application 22, controls the hardware of the GPU 18 to create the available graphics functions of the GPU 18. In the present disclosure, the user may be unaware of the GPU 18 and its functionality, particularly if the graphics module 14 is a video game console and the user is simply someone playing the video game. If the graphics module 14 is a device for creating 3D graphic videos, computer games, or other real-time or off-line rendering and the user is a software developer or artist, this user may typically be more aware of the functionality of the GPU 18. It should be understood that the GPU 18 may be utilized in many different applications. However, in order to simplify the explanations herein, the present disclosure focuses particularly on real-time rendering of images onto the 2D display device 16.

FIG. 2 is a block diagram of an embodiment of the GPU 18 shown in FIG. 1. In this embodiment, the GPU 18 includes a graphics processing pipeline 24 separated from a cache system 26 by a bus interface 28. The pipeline 24 includes a vertex shader 30, a geometry shader 32, a rasterizer 34, and a pixel shader 36. An output of the pipeline 24 may be sent to a write back unit (not shown). The cache system 26 includes a vertex stream cache 40, a level one (L1) cache 42, a level two (L2) cache 44, a Z cache 46, and a texture cache 48.

The vertex stream cache 40 receives commands and graphics data and transfers the commands and data to the vertex shader 30, which performs vertex shading operations on the data. The vertex shader 30 uses vertex information to create triangles and polygons of objects to be displayed. From the vertex shader 30, the vertex data is transmitted to geometry shader 32 and to the L1 cache 42. If necessary, some data can be shared between the L1 cache 42 and the L2 cache 44. The L1 cache can also send data to the geometry shader 32. The geometry shader 32 performs certain functions such as tessellation, shadow calculations, creating point sprites, etc. The geometry shader 32 can also provide a smoothing operation by creating a triangle from a single vertex or creating multiple triangles from a single triangle.

After this stage, the pipeline 24 includes a rasterizer 34, operating on data from the geometry shader 32 and L2 cache 44. Also, the rasterizer 34 may utilize the Z cache 46 for depth analysis and the texture cache 48 for processing based on color characteristics. The rasterizer 34 may include fixed function operations such as triangle setup, span tile operations, a depth test (Z test), pre-packing, pixel interpolation, packing, etc. The rasterizer 34 may also include a transformation matrix for converting the vertices of an object in the world space to the coordinates on the screen space.

After rasterization, the rasterizer 34 sends the data to the pixel shader 36 for determining the final pixel values. The pixel shader 36 includes processing each individual pixel and altering the color values based on various color characteristics. For example, the pixel shader 36 may include functionality to determine reflection or specular color values and transparency values based on position of light sources and the normals of the vertices. The completed video frame is then output from the pipeline 24. As is evident from this drawing, the shader units and fixed function units utilize the cache system 26 at a number of stages. Communication between the pipeline 24 and cache system 26 may include further buffering if the bus interface 28 is an asynchronous interface.

In this embodiment, the components of the pipeline 24 are configured as separate units accessing the different cache components when needed. However, the shader components can be pooled together into a unified shader, thus allowing the pipeline 24 to be configured in a simpler fashion while providing the same functionality. The data flow can be mapped onto a physical device, referred to herein as an execution unit, for executing a range of shader functions. In this respect, the pipeline is consolidated into at least one execution unit capable of performing the functions of the pipeline 24. Also, some cache units of the cache system 26 may be incorporated in the execution units. By combining these components into a single unit, the graphics processing flow can be simplified and can include switching across the asynchronous interface. As a result, the processing can be kept local, thereby allowing for quicker execution. Also, the cache system 26 can also be pooled together to create a unified cache system.

FIG. 3A is a block diagram of an embodiment of the GPU 18 shown in FIG. 1 or other graphics processing device. The GPU 18 includes a unified shader unit 50, which has multiple execution units (EUs) 52, and a cache/control device 54. The EUs 52 are oriented in parallel and accessed via the cache/control device 54. The unified shader unit 50 may include any number of EUs 52 to adequately perform a desired amount of graphics processing depending on various specifications. When more graphics processing is needed in a design, more EUs can be added. In this respect, the unified shader unit 50 can be defined as being scalable.

In this embodiment, the unified shader unit 50 has a simplified design having more flexibility than the conventional graphics processing pipeline. In other embodiments, each shader unit may need a greater amount of resources, e.g. caches and control devices, for operation. In this embodiment, the resources can be shared. Also, each EU 52 can be manufactured similarly and can be accessed depending on its current workload. Based on the workload, each EU 52 can be allocated as needed to perform one or more functions of the graphics processing pipeline 24. As a result, the unified shader unit 50 provides a more cost-effective solution for graphics processing.

Furthermore, when the design and specifications of the API 20 changes, which is common, the unified shader unit 50 is designed such that it does not require a complete re-design to conform to the API changes. Instead, the unified shader unit 50 can dynamically adjust in order to provide the particular shading functions according to need. The cache/control device 54 includes a dynamic scheduling device to balance the processing load according to the objects or scenes being processed. The cache/control device 54 may also include an allocation system to balance the data storage needs. The scheduling device and allocation system may operation in conjunction with each other or may operate independently.

More EUs 52 can be allocated to provide greater processing power to specific graphics processing, such as shader functions or fixed functions, as determined by the scheduler. In this way, the latency can be reduced. Also, the EUs 52 can operate on the same instruction set for all shader functions, thereby simplifying the processing.

Figure 3B:
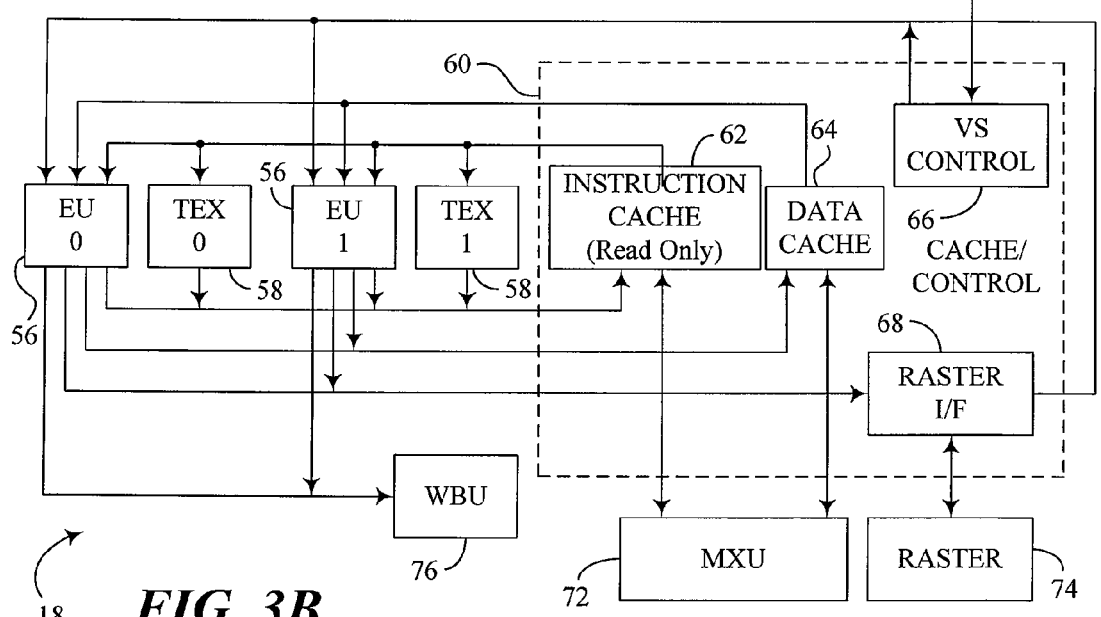
FIG. 3B is a block diagram of another embodiment of the graphics processing unit shown in FIG. 1.

FIG. 3B is a block diagram of another embodiment of the GPU 18. Pairs of EU devices 56 and texture units 58 are included in parallel and connected to a cache/control device 60. In this embodiment, the texture units 58 are part of the pool of execution units. The EU devices 56 and texture units 58 can therefore share the cache in the cache/control device 60, allowing the texture unit 58 access to instructions quicker than conventional texture units. The cache/control device 60 in this embodiment include a instruction/texture (read-only) cache 62, a data cache 64, a vertex shader control device (VS control) 66, and a raster interface 68. The GPU 18 also includes a command stream processor (CSP) 70, a memory access unit (MXU) 72, a raster 74, and a write back unit (WBU) 76.

Since the data cache 64 is a read/write cache and is more expensive than the read-only cache 62, these caches are kept separate. The different cache devices, however, can be combined together as described below. The read-only cache 62 may include about 32 cachelines, but the number may be reduced and the size of each cacheline may be increased in order to reduce the number comparisons needed. The hit/miss test for the read-only cache 62 may be different than a hit/miss test of a regular CPU, since graphics data is streamed continually. For a miss, the cache simply updates and keeps going without storing in external memory. For a hit, the read is slightly delayed to receive the data from cache. The read-only cache 62 and data cache 64 may be level one (L1) cache devices to reduce the delay, which is an improvement over conventional GPU cache systems that use L2 cache. By combining more cache resources, more cache memory can be used as local or L1 cache to reduce data retrieval time.

The VS control 66 receives commands and data from the CSP 70. The EUs 56 and TEXs 58 receive a stream of texture information, instructions, and constants from the cache 62. The EUs 56 and TEXs 58 also receive data from the data cache 64 and, after processing, provide the processed data back to the data cache 64. The cache 62 and data cache 64 communicate with the MXU 72. The raster interface 68 and VS control 66 provide signals to the EUs 56 and receive processed signals back from the EUs 56. The raster interface 68 communicates with a raster device 74. The output of the EUs 56 is also communicated to the WBU 76.

Figure 3C:
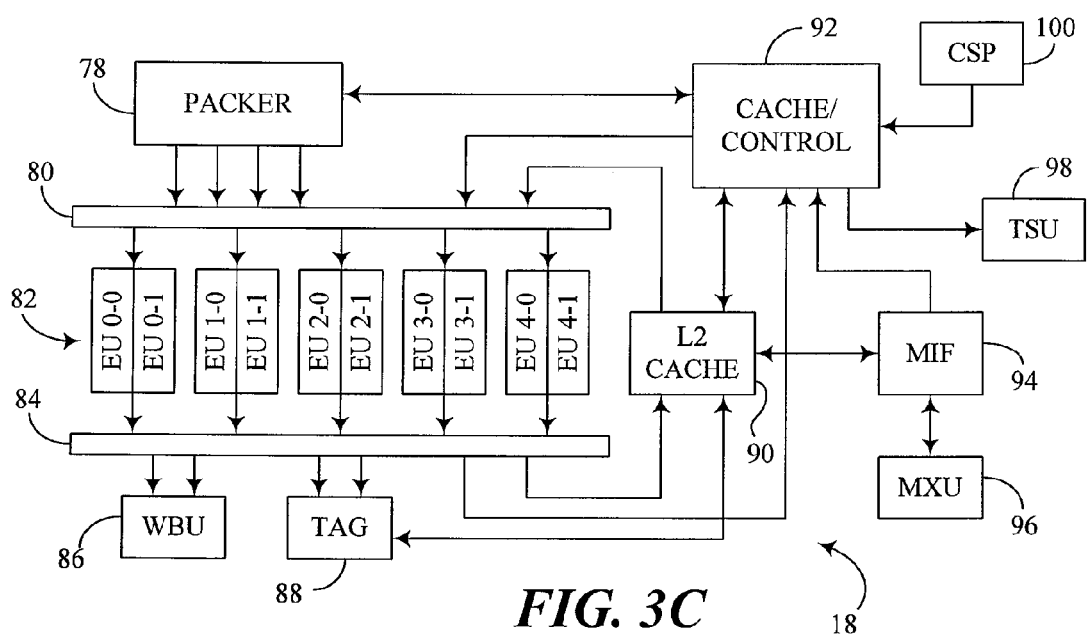
FIG. 3C is a block diagram of yet another embodiment of the graphics processing unit shown in FIG. 1.

FIG. 3C is a block diagram of another embodiment of the GPU 18. In this embodiment, the GPU 18 includes a packer 78, an input crossbar 80, a plurality of pairs of EU devices 82, an output crossbar 84, a write back unit (WBU) 86, a texture address generator (TAG) 88, a level 2 (L2) cache 90, a cache/control device 92, a memory interface (MIF) 94, a memory access unit (MXU) 96, a triangle setup unit (TSU) 98, and a command stream processor (CSP) 100.

The CSP 100 provides a stream of indices to the cache/control device 92, where the indices pertain to an identification of a vertex. For example, the cache/control 92 may be configured to identify 256 indices at once in a FIFO. The packer 78, which is preferably a fixed function unit, sends a request to the cache/control device 92 requesting information to perform pixel shading functionality. The cache/control device 92 returns pixel shader information along with an assignment of the particular EU number and thread number. The EU number pertains to one of the multiple EU devices 82 and the thread number pertains to one of a number of parallel threads in each EU for processing data. The packer 78 then transmits texel and color information, related to pixel shading operations, to the input crossbar 80. For example, two inputs to the input crossbar 80 may be designated for texel information and two inputs may be designated for color information. Also, each input may be capable of transmitting 512 bits, for example.

The input crossbar 80, which can be a bus interface, routes the pixel shader data to the particular EU and thread according to the assignment allocation defined by the cache/control device 92. The assignment allocation may be based on the availability of EUs and threads, or other factors, and can be changed as needed. With several EUs 82 connected in parallel, a greater amount of the graphics processing can be performed simultaneously. Also, with the easy accessibility of the cache, the data traffic remains local without requiring fetching from a less-accessible cache. In addition, the traffic through the input crossbar 80 and output crossbar 84 can be reduced with respect to conventional graphics systems, thereby reducing processing time.

Figure 4:
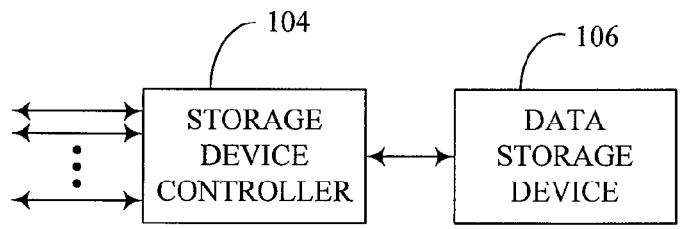
FIG. 4 is a block diagram of an embodiment of a cache system according to the teachings of the present disclosure.
Figure 5:
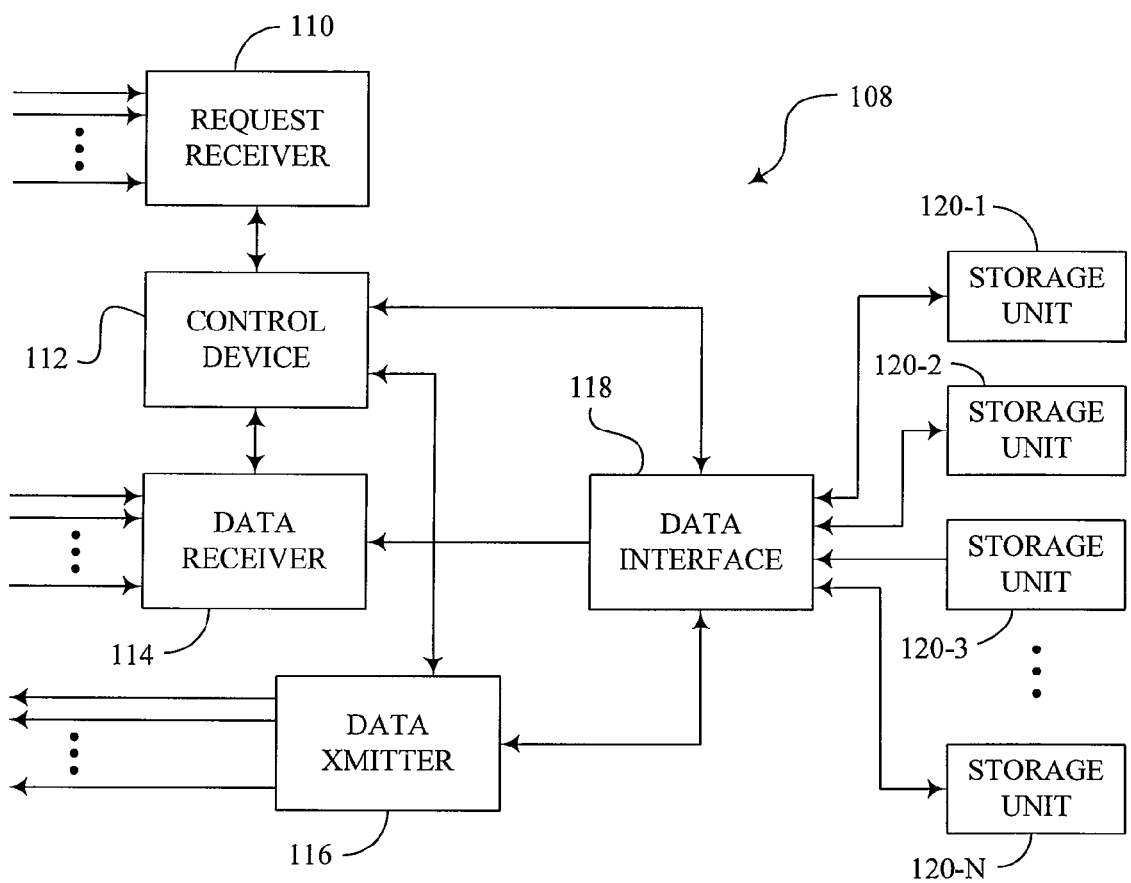
FIG. 5 is a block diagram of another embodiment of a cache system according to the teachings of the present disclosure.
Figure 6:
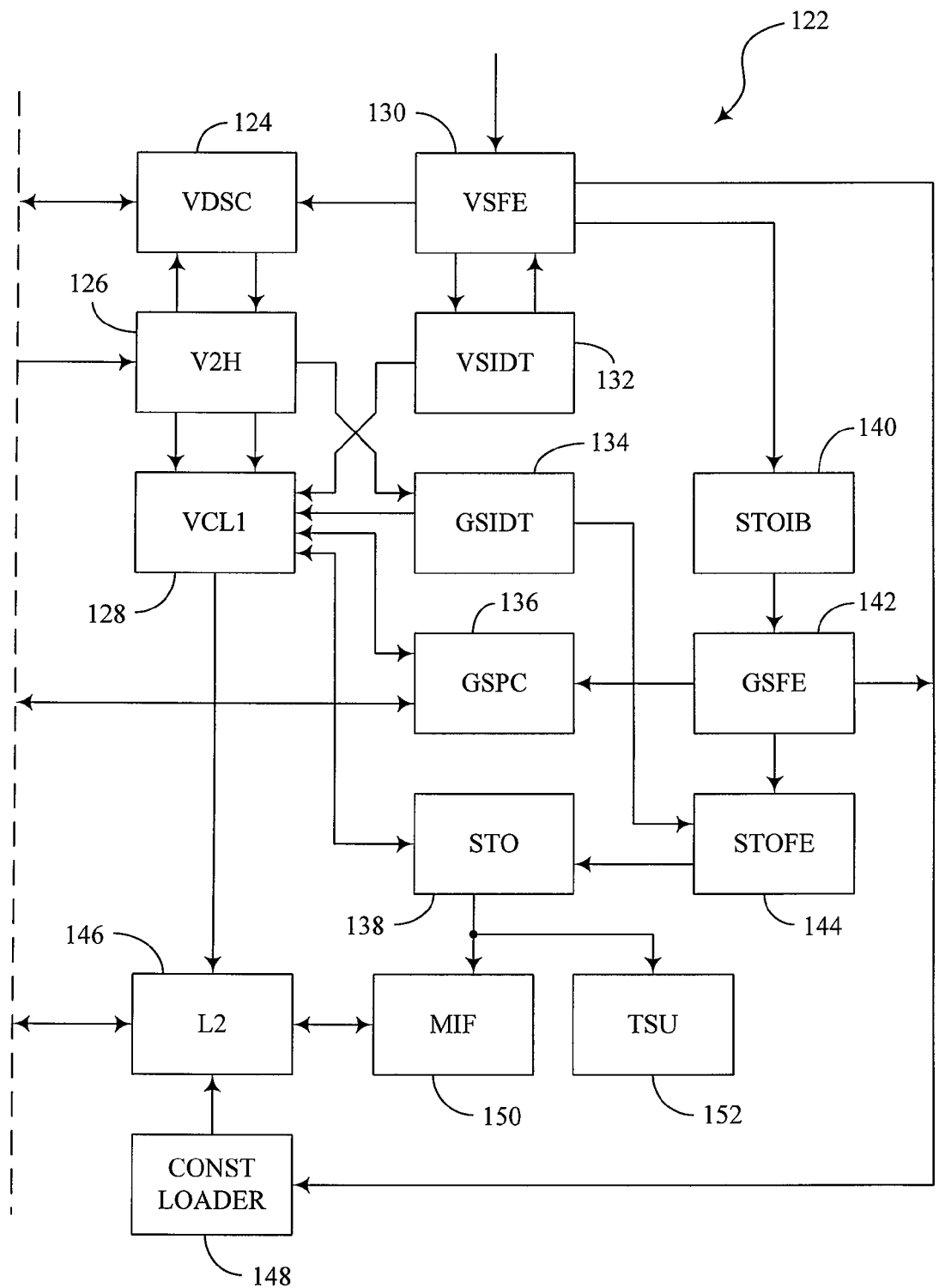
FIG. 6 is a block diagram of yet another embodiment of a cache system according to the teachings of the present disclosure.

Each EU 82 processes the data using vertex shading and geometry shading functions according to the manner in which it is assigned. The EUs 82 can be assigned, in addition, to process data to perform pixel shading functions based on the texel and color information from the packer 78. As illustrated in this embodiment, five EUs 82 are included and each EU 82 is divided into two divisions, each division representing a number of threads. Each division can be represented as illustrated in the embodiments of FIGS. 4-6, for example. The output of the EU devices 82 is transmitted to the output crossbar 84.

When graphics data are completed, the data are transmitted from the output crossbar 84 to the WBU 86, which leads to a frame buffer for displaying the frame on the display device 16. The WBU 86 receives completed frames after one or more EU devices 82 process the data using pixel shading functions, which is the last stage of graphics processing. Before completion of last stage, however, the processing flow may loop through the cache/control 92 one or more times in case of dependent texture reads. During intermediate processing, the TAG 88 receives texture coordinates from the output crossbar 84 to determine addresses to be sampled. The TAG 88 may operate in a pre-fetch mode or a dependency read mode. A texture number load request is sent from the TAG 88 to the L2 cache 90 and load data can be returned to the TAG 88.

Also output from the output crossbar 84 is vertex data, which is directed to the cache/control device 92. In response of requests, the cache/control device 92 may further send data input related to vertex shader or geometry shader operations to the input crossbar 80. Also, read requests are sent from the output crossbar 84 to the L2 cache 90. In response, the L2 cache 90 may send data to the input crossbar 80 as well. The L2 cache 90 performs a hit/miss test to determine whether data is stored in the cache. If not in cache, the MIF 94 can access memory through the MXU 96 to retrieve the needed data. The L2 cache 90 updates its memory with the retrieved data and drops old data to the memory as needed or discards read-only data. The cache/control device 92 also includes an output for transmitting vertex shader and geometry shader data to the TSU 98 for triangle setup processing.

FIG. 4 is a block diagram of an embodiment of a cache system 102 according to the teachings of the present disclosure. The cache system 102 includes, among other things, a storage device controller 104 and a data storage device 106. The storage device controller 104 is configured to communicate with multiple shader units, such as vertex shaders, geometry shaders, and pixel shaders, and with fixed function units of a GPU. Also, the storage device controller 104 is configured to communicate with unified shader units or execution units as described herein. In order to simplify the description of the present disclosure, however, the cache systems described herein are described as being in communication with shader units, but it should be understood that the cache systems may also communicate with fixed function units, unified shader units, execution units, etc.

The storage device controller 104 is configured to receive data requests from the shader units for reading or writing data. In response to the requests, the storage device controller 104 can transfer data between the shader units and the data storage device 106. Depending on the particular availability of memory space in the data storage device 106, the storage device controller 104 allocates data, such as graphics data, accordingly. In this respect, the storage device controller 104 can dynamically adjust the allocation of data as needed based on current need. When greater weight is placed on a vertex shading functionality, the storage device controller 104 may allocate more memory units within the data storage device 106 to store vertex-related data. The storage device controller 104 is also configured to coordinate reads and writes as needed.

FIG. 5 is a block diagram of another embodiment of a cache system 108. The cache system 108 includes a request receiver 110, control device 112, data receiver 114, data transmitter 116, data interface 118, and a number of storage units 120. In this embodiment, the cache system 108 may include any suitable number of storage units 120, which cumulatively can be configured as a cache divided into a number of cachelines and having any suitable configuration of cacheways. Also, the storage units 120 may include separately addressable registers or memory components. Alternatively, the storage units 120 may represent different types of cache positioned at different locations. For example, the storage units 120 may include level one (L1) and level two (L2) cache.

The request receiver 110 receives requests from any one of a number of shader units and may receive more than one request at a time. If the request receiver 110 receives multiple requests, the requests may be handled according to a predefined priority order. The control device 112 is configured to process the requests to determine and manage data transfers. For a write instruction, the control device 112 enables the data receiver 114 to receive data from a respective shader unit. The control device 112 also controls the data interface 118 to store the data in one or more appropriate storage units 120. For a read instruction, the control device 112 controls the data interface 118 to fetch the data from the addressable storage units 120. The data transmitter 116 then transmits the data to the appropriate requesting shader unit. The control device 112 manages the allocation of the data depending on the current processing functions in operation. As opposed to the prior art in which each cache device corresponding to a particular shader unit has a fixed storage capacity, the cache system 108 has storage units 120 that can be divided up according to the need of every shader unit. Also, the allocation is adjustable based on changing needs due to processing different types of graphic objects and/or scenes.

FIG. 6 is a block diagram of an embodiment of a cache system 122, which can be designed, for example, for utilization with, or in place of, the cache system 26 shown in FIG. 2 or the cache/control device 54 shown in FIGS. 3A-3C. In this embodiment, the cache system 122 includes a vertex data stream cache (VDSC) 124, a vertical-to-horizontal converter (V/H) 126, a level 1 vertex cache (VCL1) 128, a vertex shader front end (VSFE) 130, a vertex shader identification table (VSIDT) 132, a geometry shader identification table (GSIDT) 134, a geometry shader primitive constructor (GSPC) 136, a stream out device (STO) 138, a stream out index buffer (STOIB) 140, a geometry shader front end (GSFE) 142, a stream out front end (STOFE) 144, a level 2 cache (L2) 146, a constant loader 148, a memory interface (MIF) 150, and a triangle set-up unit (TSU) 152. Other embodiments may be constructed using some or all of these components in this or other arrangements, as will be understood by one of ordinary skill in the art. The cache system 122 is capable of handling multiple shader unit functions.

The VSFE 130 receives index primitives from a source, such as a command stream processor. The VSFE 130 may also receive state information, commands, and geometry primitive information. The VSFE 130 transfers index information to the VSIDT 132, also known as a hit-test device, which performs a hit/miss test with respect to the data in VCL1 128. The hit/miss results and vertex cache ID (VCID) information is returned to the VSFE 130. The VSFE 130 also transmits state, command, and miss (VCID) information to the VDSC 124. The VDSC 124 is configured to send a task request to an external vertex shader scheduler (not shown) and receive, with respect to FIG. 3A, information regarding the EU number and thread number. The VDSC 124 also sends vertex shader inputs to the input crossbar 80 (FIG. 3C).

The VDSC 124 also sends vertex shader bypass information to the V/H 126. In return, the V/H 126 receives vertex shader and geometry shader information, sends samples to the VDSC 124, and stores information in the VCL1 128. The V/H 126 can also send emit, cut, and done information to the GSIDT 134.

The VSFE 130 also sends state, command, and vertex shader VCID (VS VCID) to the STOIB 140, which passes this information to the GSFE 142. The GSFE 142 then transmits this information to the STOFE 144 and sends the VS VCID information to the GSPC 136. The STOFE 144 sends VS VCID and geometry shader VCID (GS VCID) information to the STO 138. The VSIDT 132, GSIDT 134, GSPC 136, and STO 138 send vertex shader invalid information, geometry shader invalid information, VS VCID, and VS/GS VCID, respectively, to the VCL1 128. The VCL1 128 sends vertex data to the GSPC 136 and STO 138.

The GSPC 136 also sends geometry shader information to the input crossbar 80. Also, the GSPC 136 sends a task request to an external geometry shader scheduler (not shown) and receives therefrom EU number and thread number information.

The L2 cache 146 stores overflow data from VCL1 128 if necessary and also providing pre-fetching when appropriate. The VSFE 130 and GSFE 142 send constant fetch information to the constant loader 148, which transfers constants to the L2 cache 146. The L2 cache 146 sends information to the EUs via input crossbar 80 and receives information back from the EUs via output crossbar 84. Also, the STO 138 sends vertex data to the MIF 150 and TSU 152. The L2 cache 146 and MIF 150 can exchange load and store information.

Figure 7:
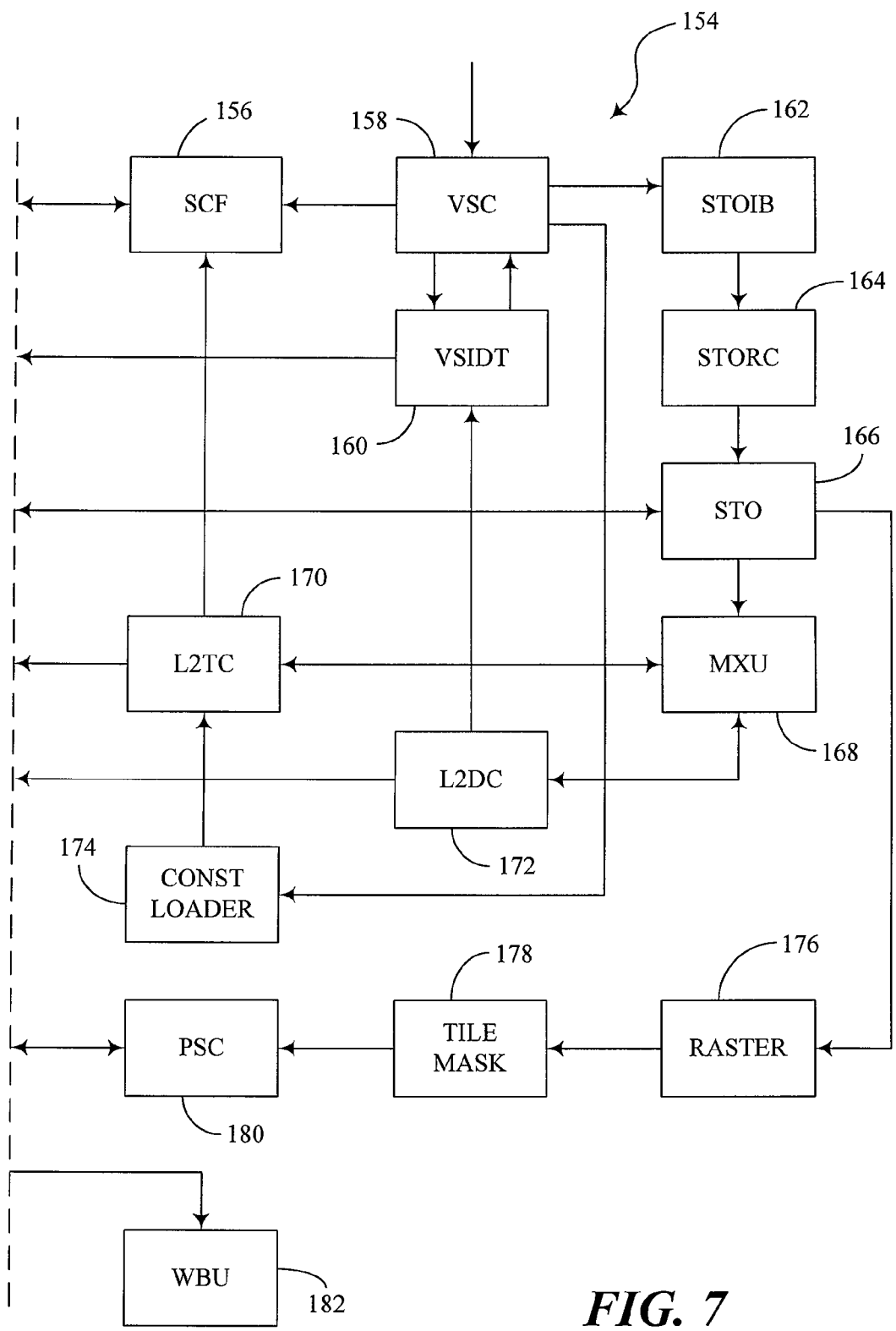
FIG. 7 is a block diagram of yet another embodiment of a cache system according to the teachings of the present disclosure.

FIG. 7 is a block diagram of another embodiment of a cache system 154, which may be associated with the cache/control devices of FIGS. 3A-3C. The cache system 154 according to this embodiment includes a stream cache formatter (SCF) 156, a vertex shader control (VSC) 158, a VSIDT 160, a STOIB 162, a stream out register control device (STORC) 164, a STO 166, a memory access unit (MXU) 168, a level 2 texture cache (L2TC) 170, a level 2 data cache (L2DC) 172, a constant loader 174, a raster block 176, a tile mask 178, a pixel shader control device (PSC) 180, and a write back unit (WBU) 182. In some embodiments, the VSC 158 may be a vertex shader front end device. This embodiment, for example, may be utilized in conjunction with a unified shader having geometry shading functionality. In this respect, the geometry shading components, as illustrated in the embodiment of FIG. 6, are omitted in this embodiment and handled by the EU components. The cache system 154 of FIG. 7 operates similarly to the embodiment described with respect to FIG. 6.

With regard to the VSC 158 and VSIDT 160, the VSIDT 160 performs the vertex hit/miss test after vertex shading operations and assigns post-vertex shader vertex cache ID (VCID) to each incoming vertex specified by a VertexID and InstanceID from a source, e.g. CSP, to the VSC 158. The VCIDT 160 receives one vertex from the VSC 158 at substantially every cycle and it performs fully set-associated hit/miss comparison on the VertexID with the entries in a VertexID tag RAM (not shown). The VertexID tag RAM may be 32 KB, for example, and each entry may have a width of a 32-bit VertexID.

If a match is found, the associated 8-bit VCID is assigned to the vertex and the reference count of VCID in the VSIDT 160 is increased by 1. Otherwise, the next VCID slots (1/2/3/4 based upon vertex size) in the VSIDT 160, when the reference counts are equal to zero, are assigned to the vertex and the starting VCID will be stored to the VertexID tag RAM. The replacement rule of the VertexID tag RAM may be first-in first-out (FIFO), for example. If a reference count of the next VCID slot is not equal to zero, the VSIDT 160 will stall and stop receiving vertices from the VSC 158.

The checking of the reference count of the next VCIDs is implemented by comparing two pointers on the VSIDT 160. An allocation pointer points to the next VCID to be invalidated in the VSIDT 160. After the hit/miss test, the starting VCID assigned to the vertex is returned to the VSC 158, which stores the VCID as a vertex entry to an EU (via SCF 156) and to STOIB 162.

The VSIDT 160 may be configured to include 256 entries. The reference count is increased when the VCID is hit in the VertexID tag RAM or it is assigned upon a miss. The reference count is decreased when the vertex is read by a GSPC (FIG. 6) or STO 166. The VSIDT 160 may assign a certain number of missed vertices to one EU based upon a pre-configured quota. For example, given a quota of 16 misses per EU, the first 16 misses may be assigned to EU 0, the next 16 misses assigned to EU 1, and so on. The indices that are used for constructing primitives are sent to the EU as well. Each primitive follows its vertices and goes to the same EU. If the vertices are stored in more than one EU, the primitive will be assigned to the one that contains most of its vertices. If a miss vertex is later hit by a primitive that is assigned to a different EU, the VSIDT 160 will send a notification to the EU that contains the vertex and request that the EU provide the data to the L2DC 172. Thus, the VSIDT 160 maintains information regarding to which EU each VCID is assigned and a data ready flag as well.

Figure 8:
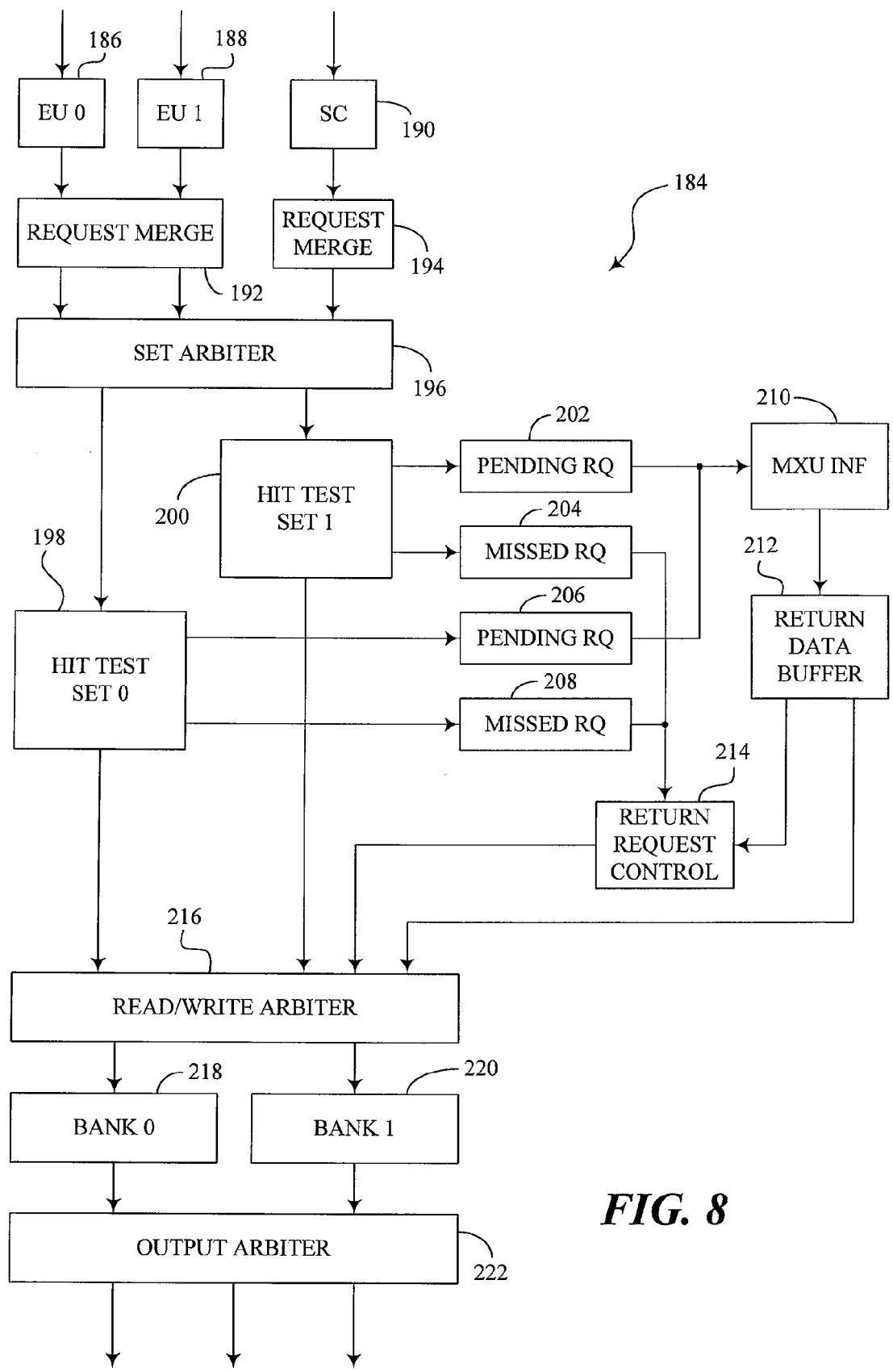
FIG. 8 is a block diagram of an embodiment of the level 2 cache shown in FIGS. 6 and 7.

FIG. 8 is a block diagram of an embodiment of a texture cache 184, which may represent the L2TC 170 shown in FIG. 7. The texture cache 184 may be configured to receive and store streams of texture information, constants, and instructions. In this embodiment, the texture cache 184 includes EU input devices 186 and 188, stream cache 190, request merge devices 192 and 194, set arbiter 196, first hit test device (set 0) 198, second hit test device (set 1) 200, pending request device 202, missed request device 204, pending request device 206, missed request device 208, memory access unit interface (MXU INF) 210, return data buffer 212, return request control 214, read/write arbiter 216, first bank (bank 0) 218, second bank (bank 1) 220, and output arbiter 222-0 (GT).

The texture cache 184 is configured to operate as an L2 cache serving the EU pool, the texture units. The texture cache 184 contains constants and instructions with respect to vertex shading operations, geometry shading operations, and pixel shading operations. The texture cache 184 also contains vertex stream data, texture data, and identification numbers for the registers used by the Texture Units.

The storage capacity of the texture cache 184 may be 64 K to 288 K bytes, for example. The texture cache 184 may include 256 2 K-bit cache lines with a line size of 2048-bit, in which each cache line contains four words. The cache lines may be divided up into four 512-bit words each on a different bank and the word selected with the bit [1:0] of the 26-bit 512-bit aligned with its virtual memory address. Also, the cache may be 128-way set associative. Memory requests to the cache may be 512-bit word requests. The texture cache 184 may be configured as a 2-bank readable and writable 512×512 cache and a total size of 64 KB. Replacement of data in the cache may follow a pseudo least-recently-used (PLRU) rule with one hit test per set per cycle. Cache R/W throughput may be two 512-bit reads/writes per cycle and a return data buffer of 2×512-bit.

In operation, the texture cache 184 can use two banks of storage units. In order to perform two hit tests per cycle, the 256 cache lines can be divided up into even and odd lines. There can be 128 cache lines in each even or odd tag, and the address bit [2] can be used to distinguish between the even or odd lines. The physical size of a megacell may be 256 lines. The cache tag can be the 17 most significant bits of the address bits. The texture cache 184 may be an L2 four-way set-associative cache and the set is selected by the bits [8:3] of the 512-bit aligned address. Each bank may have a 1RW 512-bit port. The total four banks may provide up to 4 read/write accesses for each cycle. An external write from MXU 168 may have priority over a read/write request from the requester. The replacement policy may be based on Pseudo LRU.

The addresses may be determined according to the following:

SetAddress=512-bit aligned Address [8:3] for each even or odd lines;

CacheAddress=512-bit aligned Address [8:0] for each cache line.

The instruction for a constant load of the EU may include loading 128/512-bit data that is aligned to 128/512-bit memory address, respectively. For the load instruction, the returned 128-bit data can be replicated to 512-bit and masked by the valid pixel/vertex mask and channel mask when it is written into an EU common register file (not shown). All other read requests for the instructions and constants from the EU and the T# registers from the TAG are aligned to 512-bit memory address.

The first and second hit test devices 198 and 200 include a number of test stages for performing a hit test and for reading or writing. In the first stage, address comparisons and request mergers are performed. The request merge devices 192 and 194 attempt to merge an incoming request with a request immediately preceding or immediately following the incoming request to improve performance. There are two purposes for this merge. The first one is to reduce the hit test traffic. If the traffic can be reduced, the megacell efficiency can be maintained without the need to double the hit test logic. The other purpose is that the request address tends to be a course request that provides a request in the neighborhood of the address. This merge is typically performed within one cache line, e.g. 2048 bits. For better arbitration at a later time, the request merge devices 192 and 194 can merge when the banks do not conflict with each other. An entry, containing a request or merged requests, are sent from the request merge devices 192 and 194 to the set arbiter 196 upon acknowledgement from a hit test device 198, 200.

Regarding the first stage of the hit test, the cache line can be divided into two groups of lines, from 256 lines to 128 lines, in order to execute two hit tests in a single cycle. The set arbiter 196 directs the hit test information to the respective hit test device 198, 200. One hit test device 198 is used for even lines and the other hit test device 200 is used for odd lines. The set arbiter 196 can distribute request in a round robin fashion from inputs among the EU0 186, EU1 188, and SC 190. After arbitration, the arbitrated request enters a request FIFO, which may, for example, be four or more entries deep.

In a second stage of the hit test, it is determined whether the request is a hit or miss. Since there is only one request for each hit test device 198, 200, no least-recently-used (LRU) or other complex replacement scheme needs to be implemented. The bits [8:3] of the 512-bit aligned address (SetAddress) are used as an index to look up four tags from the L2 tag RAM. The 17 most significant bits of the address are compared with the four tags to find a match.

If the first hit test device 198 determines that it is a hit in the L2 cache, the hit test device 198 sends the line address to the pending request table 206 along with the word selections, offsets, return destination IDs, and addresses of up to four requests attached to the hit test entry. If the hit test device 198 determines that it is a miss in the L2 or a hit-on-miss, the hit test device 198 writes the line address and other request information into the missed request table 208.

In some embodiments, the hit test devices 198 and 200 include particular components for performing the hit/miss test. For example, the devices may include a TAG_COL that performs the tag hit test and tag update, a LRU_TABLE that finds the next available cache line using a PLRU policy, and a LOCK_TABLE that maintains the status of each cache line. For the LOCK_TABLE, an entry of valid is used if the data comes back from the MXU INF 210. An entry of locked is used if not all of the request in missed request table 204, 208 have been cleared. And an entry of dirty is used to indicate that the cache line had been written by EU outputs. If there is a backlog, the pipe can be stalled and the hit result can be written into a two-entry hit result FIFO first.

In a third stage of the hit test, read/write arbitration is performed. The read requests from the missed request tables 204, 208 are controlled by return request control device 214. Write requests from the MXU INF 210 are sent to the return data buffer 212. The write requests are arbitrated by the read/write arbiter 216 and the requests are sent to L2 RAM, which includes the first bank 218 and the second bank 220. If the requests from different sources go to the same bank in the same cycle, the write from the MXU INF 210 takes the highest priority. After these writes, the missed results from the missed request tables 204 and 208 are processed next and the hit test results are processed last. The priority may include a round robin scheme. In order to maximize the throughput, the requests from the same source may be taken out of order as long as the arbiter 216 sends them to different banks 218, 220.

To best utilize the megacell bandwidth, the control logic will try to fill the bank request in a single cycle. For example, EU bus channel 0 can have banks 0, 1 available, EU bus channel 1 can have banks 2, 3 available, missed request pending can have bank 2 available, and MXU can have bank 1 available. The final request in the cycle includes choosing the MXU 210 to fill bank 1, choosing the missed request pending to fill the bank 2, choosing the EU bus channel 0 (186) to fill bank 0, and choosing the EU bus channel 1 (188) to fill the bank 3.

In stage four of the hit test, output arbitration is performed. The read data from the megacell is put into one-entry or two-entry data FIFOs for each bank. The texture cache 184 typically cannot stop the return data. The output to it will be sent out immediately. The returned data to the execution units and texture units might experience a backlog.

Referring again to FIGS. 6 and 7, L1 data cache may be configured to contain a tag table and a data section. There may be four 512 bits (or 2048 bits) in each cache line, where the total number of cache lines is 512. The four 512-bit entries in a single cache line share the same tag. In addition to the tag address, there are four 1-bit status bits to distinguish the cache line status. For a status of valid, this cache line has been allocated and the tag address is valid. It can be cleared after reset and any allocation will set this bit.

For a status of dirty, this cache line has been written by data other than MXU data from MXU 210. The data is written to memory if any replacement for this cache line is to occur. After each cache line allocation, it can be cleared or invalidated. It can be set if any write operation other than a MXU write occurs.

When the status is ready, this cache line is allocated and the MXU read request has been set out. A ready bit will be cleared after cache line allocation and it will be set after the MXU data arrives. This will prevent further hit-on-miss cases.

For a locked status, there could be more than one entry in the missed request table 204, 208 for this cache line. It is the result of a miss or a hit-on-miss case. The lock will set after the cache allocation. The bit will be cleared if all entries belonging to this cache line are removed from the missed request table 204, 208. It will allow this cache to be allocated for replacement.

With reference again to FIG. 8, if there is a read miss or hit-on-miss in the L2, the missed read table 204, 208 is searched. An entry is selected to store the cache line address and other information of the request (the return destination unit ID, the entry type, the thread ID, the CRF index, the task sequence ID, etc.). Data from the MXU 210 goes to a cache line number in the cache. Since there are two tables, each table is able to cover 128 lines. The bank valid signal specifies which entries are valid.

If there is a write miss in the L2, the missed request table 204, 208 is searched and a free entry is selected to be stored in the cache line address. The cache line will be allocated like read misses and write data can be written into cache directly. In order not to over-write the existing data in the cache line, a write mask buffer is maintained for pending missed requests due to write misses. When the data comes back from the MXU 210, the read/write arbiter 216 will check the write mask and update to the corresponding cache lines.

Upon a cache miss, a read request to the MXU 210 is sent to the miss request table 204, 208. There are two request tables in communication with each hit test unit 198, 200. Each one contains up to 32 pending read request entries. For the read requests, the return L2 cache line address (9-bit) is sent along with the virtual memory address and later can be used to search for the request entry in the miss request table when the data is returned from the MXU 210. Each read request can expect to get one cache line back (2048 bits or 4×512 bits).

The pending request FIFO 202, 206 has substantially the same size as the miss request tables 204, 208. The entries in the miss request tables 204, 208 usually are not to be cleared until the data comes back from the MXU 210. Therefore, the full condition of the FIFO can be ignored since it is not to be overwritten if the missed request table 204, 208 has been properly managed.

The return request control device 214 can be configured as a data buffer using a 4×512-bit 4R1W memory. To get the best efficiency for accessing the megacell, the return request control device 214 groups four consecutive groups of data that belong to one cache address. Once all four data groups are ready, the return request control device 214 passes the data to the read/write arbitrator 216 to write the data back. The return request control device 214 is configured to ensure that the data coming from the MXU 210 is not mixed with data designated for a different cache address. That is, the data belonging to the same read request (one read request and four data returns) are to be grouped together. When the read/write arbitrator 216 receives the data, it can check for write mask information in the write mask buffer. Also, it can generate an entry in a return request queue to notify the missed request table 204, 208 that the cache line is ready. The read/write arbitrator 216 notifies the cache tag when this cache line is ready to prevent further hit-on-miss test results.

The return request control device 214 may include a 64-entry return request queue containing the 9-bit cache line addresses. When a data entry is read from the return data buffer 212 and sent to the cache RAM, a new entry is added to the return request queue to store the new cache line address. The return request control device 214 reads the first queue entry from the bottom, and uses the cache line address to search both missed request tables 204, 208 for a match. At every cycle, one matched entry is processed and the request is sent to the read/write arbiter 216. The request may have a lower priority than the write request from the return data buffer 212, but a higher priority than the request from the hit test units 198, 200. After the read/write arbiter 216 grants access for the banks from this request to the cache RAM for read, the entry is freed and marked as invalid.

After all matched entries in the missed request table 204, 208 for a given bank of the line address are processed; the entry in the return request queue of the return request control device 214 is removed. In the meantime, a signal will be sent to the cache tag table to unlock this cache line in the cache tag.

The texture cache 184 can also perform a coherence check operation. With the write capability introduced, the cache line could be dirty if a new miss line is allocated. The output arbiter 222 moves the dirty line to a write buffer (not shown) and waits for an MIF interface to retrieve the line. For example, given a cache line having a physical address A in a certain cache line location and assuming the cache line gets dirty, the output arbiter 222 can attempt to replace the dirty cache line with a new miss cache address. It may take a few cycles to read the dirty data from the megacell, send the data to the write buffer, and allow the MIF interface to retrieve the data. If there is a request regarding address A coming in between, the output arbiter 222 can send the data to the MIF before the dirty data arrives, since the data read back might be incorrect.

To maintain the data coherence, there is counter inside each hit test device 198 and 200. The counter is configured to increment every time a dirty replacement occurs. Both the missed read request and dirty cache line replacement actions assume the value of the counter. In the L2 cache of the EU pool's MIF unit, the L2 cache reserves a place to store the counter value. The copy in the L2 cache can be updated from the write request. The texture cache 184 can then serve the read requests that have a counter value equal to the current value held in the MIF.

The Data Cache of the EU pool serves the EUs as a level two (L2) cache. It is configured to contain the spilled inputs, outputs, and temp array registers of the data from the vertex shader, geometry shader, and pixel shader units. It also contains the spilled content of a vertex attribute buffer (not shown). The size of the cache RAM, for example, may be 32 Kbytes and include 128 2 K-bit cache lines, where each cache line has four words and is fully associative. The memory requests are received as 512-bit words. The cache configuration is 1RW 256×512-bit with one read or write test per cycle. The R/W throughput can be one 512-bit read/write per cycle and the return data buffer can be 2×512-bit.

The functional description of the L2 data cache includes using two banks of 1RW 512×512-bit memories and having a total size of 32 KB. The texture cache 184 may have 256 cache lines with a line size of 2048-bit. The cache line may be divided up into four 512-bit words each on a different bank and the work is selected with the bit [1:0] of the 512-bit word aligned to the virtual memory address. The replacement policy may be based on PLRU.

Regarding loading and storing with respect to the texture cache 184, the EU load/store instructions LD4/8/16/64 can load 128/512-bit data, which is aligned to 32/64/128/512-bit memory address respectively. For the load instruction, the returned 32/64/128-bit data is replicated to 512-bit and masked by the valid pixel-vertex mask and channel mask when it is written into the EU Common Register File (CRF). All other read requests for the spilled registers and VAB content from the EU are aligned to 512-bit memory address.

The unified cache systems described in the present disclosure can be implemented in hardware, software, firmware, or a combination thereof. In the disclosed embodiments, portions of the unified shades and execution units implemented in software or firmware, for example, can be stored in a memory and can be executed by a suitable instruction execution system. Portions of the unified shaders and execution units implemented in hardware, for example, can be implemented with any or a combination discrete logic circuitry having logic gates, an application specific integrated circuit (ASIC), a programmable gate array (PGA), a field programmable gate array (FPGA), etc.

Figure 9:
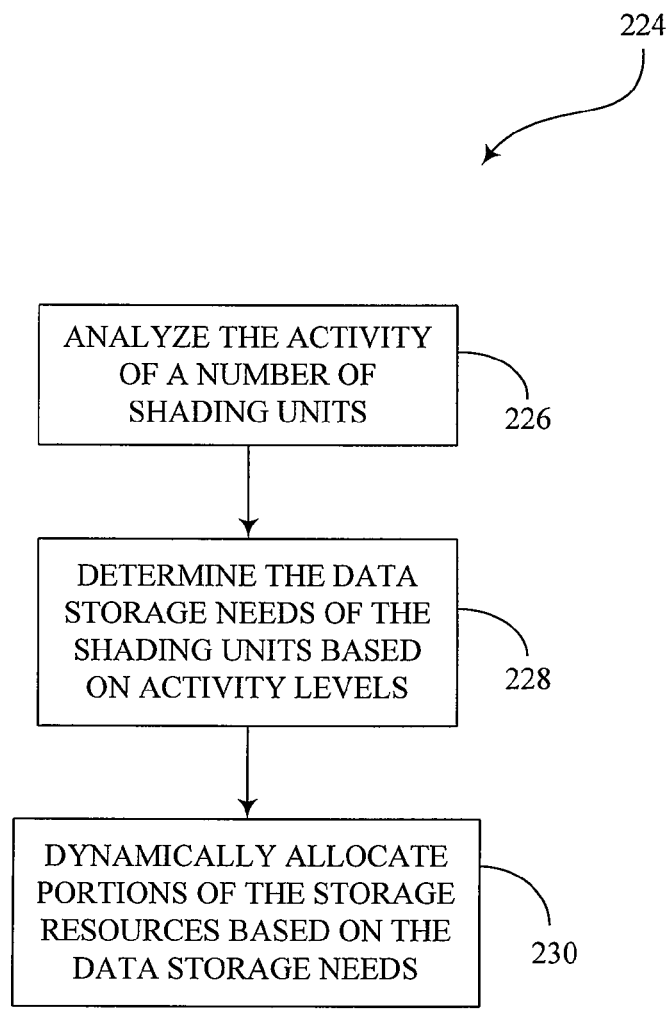
FIG. 9 is a flow chart illustrating an embodiment of a method for managing data in a cache system of a graphics processor.

FIG. 9 is a flow chart illustrating an embodiment of a method 224 for handling graphics data. The method 224 according to this embodiment includes analyzing the activity of a number of shader units, as shown in block 226. The shader units may include any combination of vertex shaders, geometry shader, and pixel shaders. Also, the shader units may be formed together in a unified shader or configured in an execution unit. The activity that is analyzed in block 226 may be the processing level or processing amount, which may be a factor of the image or scene currently being processed.

In block 228, the data storage needs of the shading units is determined based on the respective activity levels of the shading units. Regarding storage of data, the data can be stored in a cache, for example, which may be a single cache component capable of providing storage capacity for each stage of shader processing. The cache can supply data to the shader units and/or receive processed data from the shaders units. The storage needs may be represented by a percentage of the processing activity of each shader unit.

In block 230, the method 224 further comprises dynamically allocating portions of the cache resources based on the data storage needs. The allocation process may include a portion or percentage of the cache allocated to each particular shader unit. The cache can be the portions of cache used to supply data to the respective shader units and/or the portions of cache used to receive data from the respective shader units. Block 230 may further include dividing the cache into separately addressable portions and allocating as needed. Also, the allocation can be changed or adjusted as needed when the objects or scenes change.

The functionality of the unified cache systems described herein can include an ordered listing of executable instructions for implementing logical functions. The executable instructions can be embodied in any computer-readable medium for use by an instruction execution system, apparatus, or device, such as a computer-based system, processor-controlled system, or other system. A "computer-readable medium" can be any medium that can contain, store, communicate, propagate, or transport the program for use by the instruction execution system, apparatus, or device. The computer-readable medium can be, for example, an electronic, magnetic, optical, electromagnetic, infrared, or semiconductor system, apparatus, device, or propagation medium.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

We claim:

1. A cache system of a graphics processing unit (GPU), the cache system comprising:

a data storage device configured to store graphics data processed by or to be processed by one or more shader units; and a storage device controller in communication with the data storage device, the storage device controller configured to dynamically control a storage allocation of the graphics data within the data storage device, wherein the storage device controller dynamically controls the storage allocation based on an activity level of the one or more shader units.

2. The cache system of claim 1, wherein the storage device controller comprises a vertex shader identification table (VSIDT).

3. The cache system of claim 2, wherein the storage device controller further comprises a geometry shader identification table (GSIDT).

4. The cache system of claim 3, wherein the data storage device comprises a level one (L1) vertex cache in communication with the VSIDT and GSIDT.

5. The cache system of claim 1, wherein the one or more shader units are embodied in a unified shader unit.

6. The cache system of claim 1, wherein the storage device controller comprises a level two texture cache (L2TC) configured to perform a hit/miss test.

7. The cache system of claim 6, wherein the level two texture cache performs parallel hit/miss tests substantially simultaneously in two or more cache line sets.

* * * * *